United States Patent [19]

Kano

[11] Patent Number: 5,428,559
[45] Date of Patent: Jun. 27, 1995

[54] PREDICTIVE CONTROL METHOD AND APPARATUS

[75] Inventor: Makoto Kano, Urayasu, Japan

[73] Assignee: Kabushiki Kaisha Toshiba, Kawasaki, Japan

[21] Appl. No.: 929,111

[22] Filed: Aug. 13, 1992

[30] Foreign Application Priority Data

Aug. 14, 1991 [JP] Japan .................. 3-204494

[51] Int. Cl.$^6$ ............................................ G05B 13/04
[52] U.S. Cl. ..................... 364/578; 364/151; 395/22
[58] Field of Search .......... 364/578, 150, 151; 395/22, 23, 24

[56] References Cited

U.S. PATENT DOCUMENTS

| | | | |
|---|---|---|---|
| 4,195,337 | 3/1980 | Bertrand et al. | 364/151 |
| 4,578,747 | 3/1986 | Hideg et al. | 364/151 |
| 4,990,838 | 2/1991 | Kawato et al. | 395/22 X |
| 5,025,282 | 6/1991 | Nakamura et al. | 395/22 |
| 5,033,006 | 7/1991 | Ishizuka et al. | 395/23 |
| 5,092,343 | 3/1992 | Spitzer et al. | 395/22 |
| 5,095,443 | 3/1992 | Watanabe | 395/24 |
| 5,109,275 | 4/1992 | Naka et al. | 395/22 X |
| 5,111,516 | 5/1992 | Nakano et al. | 382/14 |
| 5,119,468 | 6/1992 | Owens | 395/22 |
| 5,134,396 | 7/1992 | Sirat et al. | 395/22 |
| 5,204,872 | 4/1993 | Staib et al. | 395/22 X |
| 5,220,373 | 6/1993 | Kanaya | 395/22 X |

FOREIGN PATENT DOCUMENTS

WO90/10270  7/1990  WIPO.

OTHER PUBLICATIONS

Frye et al., "Back-Propagation Learning and Nonidealities in Analog Neural Network Hardware", IEEE Trans. on Neural Networks, vol. 2 No. 1, Jan. 1991, pp. 110–117.

Primary Examiner—Emanuel T. Voeltz
Assistant Examiner—Eric W. Stamber
Attorney, Agent, or Firm—Banner, Birch, McKie & Beckett

[57] ABSTRACT

This invention relates to a predictive control method and apparatus for controlling a nonlinearly controlled object, such as a manipulator. The method and apparatus can control an object having unknown dynamic characteristics and can compensate for disturbances. A multi-layered neural network is provided as an identification model for the object to the controlled. A controlled variable signal received from the object and a manipulated variable signal for controlling the object are fed into the neural network to predict a future value of the controlled variable signal using forward calculation. The predicted future value is compared with a desired control variable value to produce an error value. The error value is input to the neural network to compute a correction value for the manipulated variable signal using back-propagation. The correction value is used to modify the manipulated variable signal value to thereby control the object.

14 Claims, 9 Drawing Sheets

PREDICTIVE CONTROL METHOD AND APPARATUS

BACKGROUND OF THE INVENTION

1. Field of the Invention

The present invention relates to a predictive control method and apparatus for predicting a controlled variable upon the control of an object; to be nonlinearly controlled, such as a manipulator.

2. Description of the Related Art

As a method for controlling an object to be nonlinearly controlled, such as a manipulator, two methods are conventionally known: a nonlinear compensation/feedback control-combined method and a method of computed torque (or inverse problem method) for finding a manipulated variable from a mathematical model of an object. These respective methods cannot make accurate control of an object if the mathematical model (the dynamic characteristic of the mathematical model) is not known.

In addition to the aforementioned methods, several object control methods using a controllable neural network have been proposed which comprise enabling the neural network to acquire the dynamic characteristic of an object through the learning by the neural network and enabling the characteristic to be controlled even if an associated mathematical model is unknown. However, the method comprises performing feed-forward control by computing a manipulated variable from a target controlled variable so that no compensation can be made for any disturbance involved.

The present invention is directed to a predictive control method and apparatus for controlling an object for predictive evaluation, which can control an object unknown in mathematical model for its dynamic characteristic in a predictive evaluation fashion and can compensate for any disturbance involved.

SUMMARY OF THE INVENTION

It is accordingly the object of the present invention to provide a predictive control method and apparatus, the method comprising preparing a multi-layered neural network as an identification model for an object to be controlled when the object is controlled upon being given a manipulated variable for predictive evaluation; inputting a controlled variable and manipulated variable for the object, at the current sampling time, to the identification model to predict the controlled variable at a sampling time within a range from the current sampling time to a predetermined time; finding an error in respect to the desired controlled variable of a predictive value obtained; inputting the error to the identification model; calculating a correction value of the manipulated variable at a current time through back-propagation calculation; and correcting the manipulated variable given to the object to be controlled.

According to the present invention, a manipulated variable and controlled variable for an object to be controlled are input to a multi-layered neural network and, by so doing, it is possible to predict a controlled variable from the current time to a predetermined time through a forward calculation, to compute a correct manipulated variable, through back propagation by the neural network, from an error between a predicted controlled variable and a desired controlled variable, and to control an object unknown in mathematical model for its characteristic or an object high in nonlinearity of its dynamic characteristic. Further, the multi-layered neural network receives, together with a manipulated variable, a controlled variable realized at that time through a feedback loop, so that the manipulated variable is corrected to approach a controlled variable after a sampling period to a target controlled variable and hence compensation can also be made for any disturbance involved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

Figure 1:
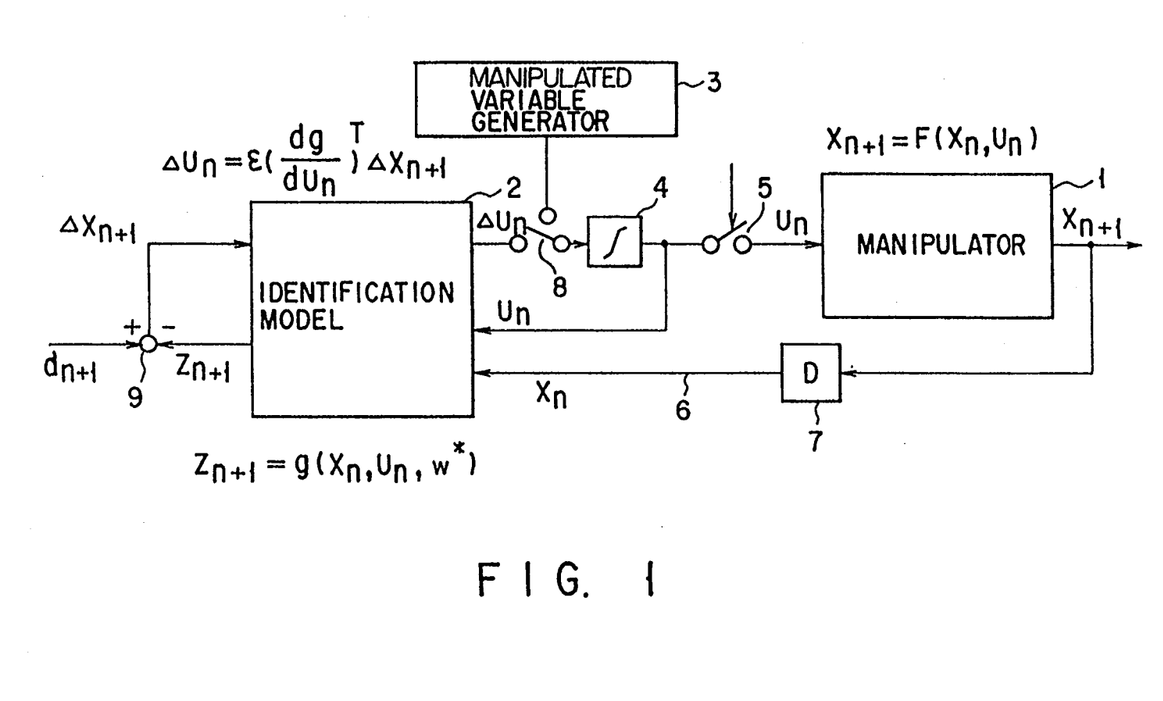
FIG. 1 is a block diagram generally showing an arrangement of an apparatus for performing a method of the present invention.

In an apparatus shown in FIG. 1, a control object is comprised of, for example, a manipulator 1. A correction-amount ($\Delta U_n$) output terminal of an identification model 2 comprised of a multi-layered neural network model, and an output terminal of a manipulated variable generator 3 are connected to corresponding input terminals of a switch 8. The common terminal of the switch 8 is connected to an input terminal of an integrator 4. The output terminal of the integrator 4 is connected to a manipulated variable ($U_n$) input terminal of the manipulator 1 through a switch 5 and to a manipulated variable ($U_n$) input terminal of the identification model 2. A controlled variable ($X_{n+1}$) output terminal of the manipulator 1 is connected to a controlled variable ($X_n$) input terminal of the identification model 2 through a delay circuit 7 in a feedback loop 6. A predictive value ($Z_{n+1}$) output terminal of the identification model 2, together with a target value ($d_{n+1}$) input terminal, is connected to a corresponding input terminal of a subtracter 9. The output terminal of the subtracter 9 is connected to an error ($\Delta X_{n+1}$) input terminal of the identification model 2.

Figure 2:
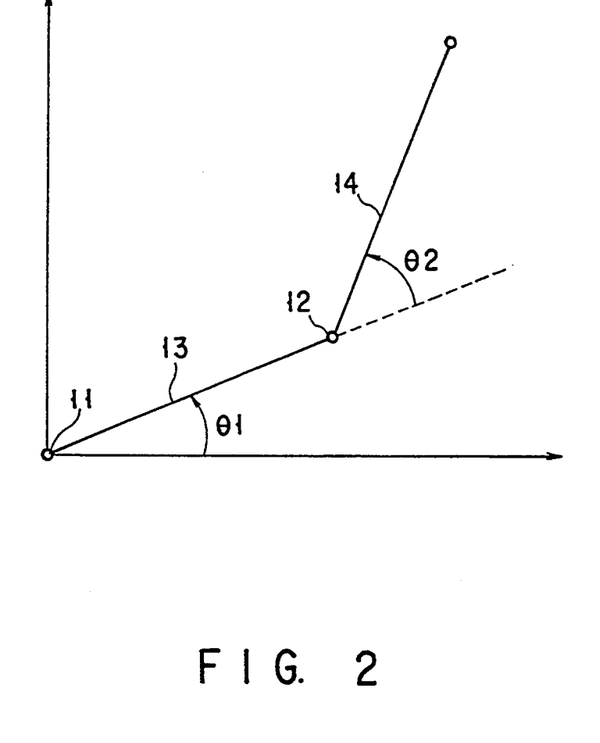
FIG. 2 is a view for explaining a manipulator of FIG. 1.

Here a two-joint type manipulator having a first joint 11 and second joint 12 as shown in FIG. 2 will be explained below as one example of a target to be controlled. However, the present invention is not restricted thereto and can be applied to any other object to be nonlinearly controlled.

FIG. 2 shows an example where the manipulator 1 includes a first link 13 defining a first joint angle $\theta 1$ made to an X-axis and a second link 14 defining a second joint angle $\theta 2$ made to an extension of the link 13 on a coordinate system in which case first and second torques $\tau 1$ and $\tau 2$ are applied, in a positive joint angle direction, to first and second joints 11 and 12, respectively.

A joint angle torque $U_n = (\tau 1, n, \tau 2, n)T$, which is a manipulated variable, at time $n\Delta t$ is input to the manipulator 1 where the state $$X_{n+1} = F(X_n, U_n)$$

that is, $X_{n+1} = (\theta 1, n+1, \theta 2, n+1, \theta'1, n+1, \theta'2, n+1)T$ is measured as a controlled variable after a sampling period $\Delta t$, where $\tau 1$, n and $\tau 2$, n: the first and second joint torques at time $n\Delta t$;

$U_n$: the torque vector;

$\theta 1$, n and $\theta 2$, n: first and second joint angles at time $n\Delta t$;

$\theta'1$, n and $\theta'2$, n: first and second joint angular velocities at time $n\Delta t$; and $X_n$: the state vector with these angular velocities as components.

Figure 3A:
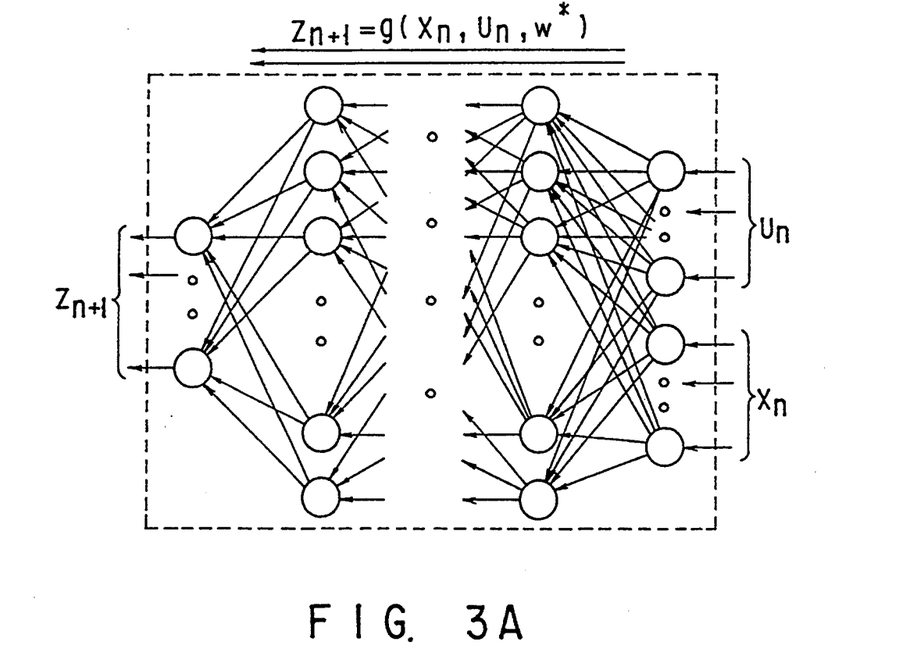
FIGS. 3A and 3B are a view for explaining a first form of an identification model shown in FIG. 1.
Figure 3B:
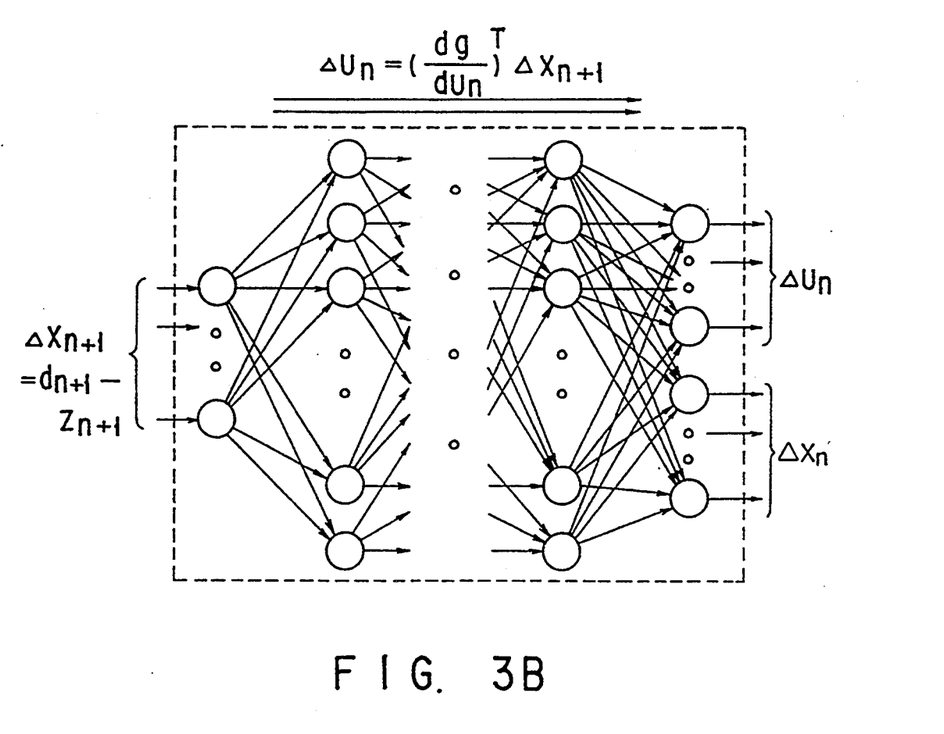

The identification model 2 includes a multi-layered neural network model as shown in FIG. 3A or 3B. When the manipulated variable, $U_n$, and the controlled variable, $X_n$, of the manipulator 1 are input to the neural network by previously learning on the basis of a later-described error back-propagation learning method as shown in FIG. 3A, a predictive value $Z_{n+1}$ of the controlled variable at a sampling time is computed to generate an output. Also, as shown in FIG. 3B, an error $\Delta U_n$ of the torque $U_n$ is computed, through error back-propagation calculation, with the use of an error between the predictive value $Z_{n+1}$ and the target value $d_{n+1}$. The neural network model as shown in FIG. 3A or 3B has a first layer on the right side and a final layer on the left side.

Figure 4:
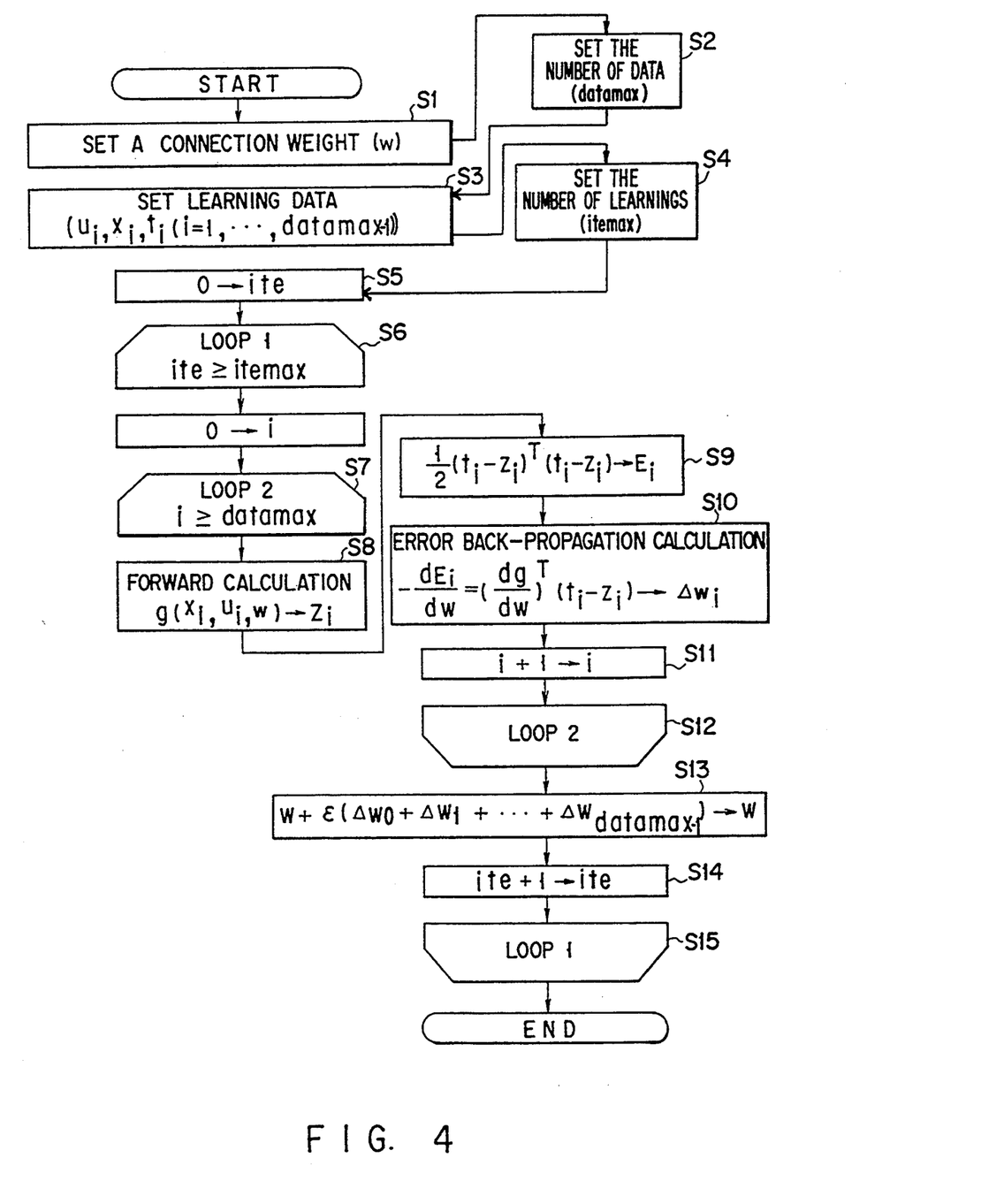
FIG. 4 is a flow chart for explaining an error back-propagation learning method.

Now the back-propagation learning method will be explained below with reference to a flow chart as shown in FIG. 4.

The back-propagation learning method is the most commonly employed method. The method comprises computing the steepest descent direction of an error function surface defined in a connection weight space and varying the connection weight in that direction. More specifically, the method is a method for computing a gradient vector of an error function surface, and changing a connection weight in a direction opposite to the gradient vector. This gradient vector shows a direction toward the steepest ascent slope at a surface point of an error function.

First, the initial value of the connection weight w is set to the neural network model by random numbers (step S1). Then, the number of data (datamax) is set at a predetermined value (S3). In step S2, data to be learned, that is, input signals $U_i$ and $X_i$ and corresponding desired output signal $t_i$ are set to the neural network model in which case $i = 1, 2, \ldots$, datamax. In step S4, the number of learning cycles (itemax) is set at a predetermined value. In step S5, "ite" is set at 0. In step S6, calculation is iterated until ite $\geq$ itemax is established.

Then, "i" is set to Q an amount of variation of the connection weight is computed for all data involved (S7 to S12).

The input signals $U_i$ and $X_i$ of the data are input to the neural network model and a corresponding output signal is found through a forward calculation (S8). From the output value $Z_i$ and output value $t_i$, an error function $E_i$ is defined as follows (S9):

$$\tfrac{1}{2}(t_i - Z_i)T(t_i - Z_i)$$

The steepest descent direction $\Delta$wi (an amount of variation of the connection weight of the neural network computed by the i-th learning data item) is computed by back propagation (S10). In the equation of S10, $dE_i/dw$ and $dg/dw$ show a partial differential. The computation of steps S8 to S10 is done for all the data involved (S7, S11, S12).

Using the steepest descent direction of each data item found, the connection weight w is varied as will be set out below (S13). That is, $$W + \epsilon(\Delta w0 + \Delta W1 + \ldots + \Delta w_{datamax-1}) \rightarrow w$$

where $\epsilon$ denotes a parameter of a variation of the connection weight called a learning rate.

The value of the error function is decreased by repeating these steps itemax times (S5, S6, S14, S15).

The predictive value $Z_{n+1}$ of the dynamic characteristic of the manipulator 1 corresponding to the output of the learning-ended identification model can be expressed as the following function:

$$Z_{n+1} = g(X_n, U_n, w^*)$$

where $w^*$: the connection weight of the learning-ended neural network model; and $Z_{n+1}$: the predictive value of the controlled variable at time $(n+1)\Delta t$.

In FIG. 1, the manipulated variable generator 3 is adapted to generate an initial manipulated variable $U_o$ at a motion start time only.

An amount of correction, $\Delta U_n$, from the identification model 2 is added to the manipulated variable, $U_n$. The prediction of the controlled variable and correction of the manipulated variable after the sampling period are computed once, or a plurality of times, in the sampling time. The switch 5 is operated at each sampling time (a unit time, for example, 0.01 second) at which time an output of the switch 8 is delivered to the integrator 4 and from there as the manipulated variable, $U_n$, to the manipulator 1.

The control operation of the manipulator 1 will be explained below with reference to FIG. 5.

First, a target path ($d_n$) is set at step S20. A manipulated variable signal, $U_o = U(d_o)$ with which the manipulator 1 takes an initial attitude ($x_o = d_o$) is set to the manipulated variable signal generator 3 (S21). The manipulated variable signal, $U_o$, is delivered from the integrator 4 past the switch 5 to the manipulator 1 so that it coincides with the initial attitude of the manipulator on the target path.

When the manipulator 1 starts its motion, the prediction of the controlled variable signal and correction of the manipulated variable signal by back propagation, after a sampling time $\Delta t$, are repeated at steps S25 to S31.

A manipulated variable signal, $U_n$, and a controlled variable signal, $X_n$, fed back past the delay circuit 7, are input to the neural network model and the predictive value $Z_{n+1}$ of the controlled variable signal is found after a sampling time $\Delta t$ second (S26).

Let it be assumed that, in this case, a controlled variable signal at time $n\Delta t$ is given as $$X_n = (X_1, n, X_2, n, \ldots, X_N, n)$$

and that a manipulated variable at time $n\Delta t$ is given as $$U_n = (U_1, n, U_2, n, \ldots, U_M, n)$$

Let it also be assumed that, in a neural network model comprised of three layers (an input layer, intermediate layer and output layer), the input layer unit number, intermediate layer unit number and output layer unit number are indicated by Ni, Nh and No, respectively (Ni=N+M because the manipulated variable and controlled variable are input to the neural network model and No=N because the controlled variable is output from the manipulator 1).

Let it further be assumed that the input value of an i-th unit in the input layer is qi(i); the input value, output value and threshold value of a j-th unit in the intermediate layer are ph(j), qh(j) and thh(j), respectively; the input value, output value and threshold value of a k-th unit in the output layer are po(k), qo(k) and tho(k), respectively; the connection weight value between the i-th unit in the input layer and the j-th unit in the intermediate layer is wi(i,j); and the connection weight between the j-th unit in the interlayer and the k-th unit in the output layer is wo(j,k).

Under these conditions, the predictive computation at time $n\Delta t$ is given by:

$$pi(i) = U_i, n \quad (i = 1, 2, \ldots, M)$$

$$pi(i + M) = X_i, n \quad (i = 1, 2, \ldots, N)$$

$$qi(i) = pi(i) \quad (i = 1, 2, \ldots, Ni)$$

$$ph(j) = \sum_{i=1}^{Ni} wi(i,j)qi(i) - thi(j)$$

$$qh(j) = f(ph(j)) \quad (j = 1, 2, \ldots, Nh)$$

$$po(k) = \sum_{j=1}^{Nh} wo(j,k)qh(j) - tho(k)$$

$$qo(k) = po(k)$$

$$Z_{k, n+1} = qp(k) \quad (k = 1, 2, \ldots, No)$$

f shows an input/output function of the intermediate layer's unit. In general, a sigmoid type function as given below is used.

$$f(p) = \frac{1}{1 + \exp(-p)}$$

From the error $\Delta X_{n+1} = d_{n+1} - Z_{n+1}$ between the predictive value $Zn+1 = Z_{n+1} = (Z_n, n+1, Z_2, n+1, \ldots, Z_N, n+1)$ and the target value $d_{n+1} = (d_1, n+1, d_2, n+2, \ldots, d_N, n+1)$ the error function $E_{n+1}$ is defined as follows (S27):

$$E_{n+1} = \tfrac{1}{2}(\Delta X_{n+1})^T Ks(\Delta X_{n+1})$$

provided that Ks is a gain determinant.

Through back propagation, an amount of correction of the input signal is evaluated to decrease the value of the error function (S28).

$\Delta U_n = -(dE_{n+1})/(dU_n);$
$\quad dg(X_n, U_n, w^*)/dU_n \times (Ks \Delta X_{n+1})$
$\Delta X_n = -(dE_{n+1})/(dX_n)$
$(U_n + \Delta U_n \rightarrow U_n)$ Of the input signal, the value of the manipulated variable is corrected as $(U_n + \Delta U_n \rightarrow U_n)$ at step S29.

Again, the predictive value $Z_{n+1}$ of the controlled variable after the sampling time corresponding to the corrected input signal is evaluated and the correction of the manipulated variable is repeated. After the correction has been repeated a predetermined number of times (k times), the manipulated variable is input to the manipulator 1 at the sampling time (S32). These steps are repeated until a final time (time f) as at steps S22, S23, S33 and S35.

At the initial time, the manipulated variable, $U_n$, is given from the manipulated variable generator 3 and subsequently the value of a manipulated variable, $U_{n+1}$, at the previous time is set as an initial value of the manipulated variable, $U_n$, at the current time (S34). If the neural network model fully learns the dynamic characteristic of the manipulator, then the connection weight of the neural network model is a correct value. In this case, when an error occurs between the predictive value $Z_{n+1}$ and the desired value $d_{n+1}$, it will be caused by the controlled variable, $X_n$, and manipulated variable, $U_n$, which are input to the identification model. Since, of these variables, the controlled variable, $X_n$, is a measured value, only the manipulated variable, $U_n$, is corrected so that the desired value $d_{n+1}$ is approached to the desired value after the sampling time. If the manipulated variable at a given time approximates the manipulated variable at the next time with a short sampling time, then it may be possible to evaluate the value of a manipulated variable reaching a target state a less number of times with the use of the value of the manipulated variable at the previous time as an initial. value.

Figure 5:
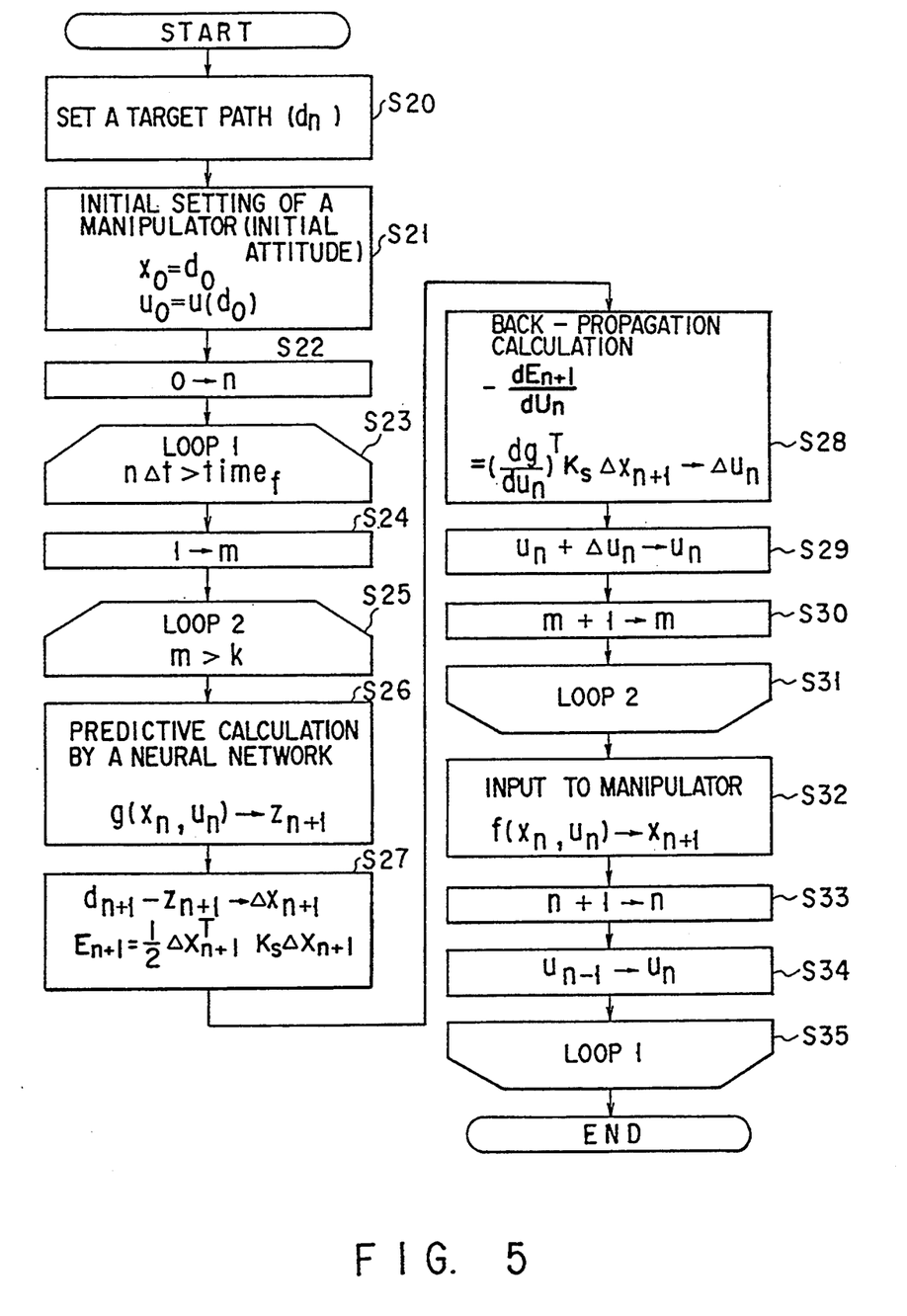
FIG. 5 is a flow chart for explaining a control operation shown in FIG. 1.
Figure 6A:
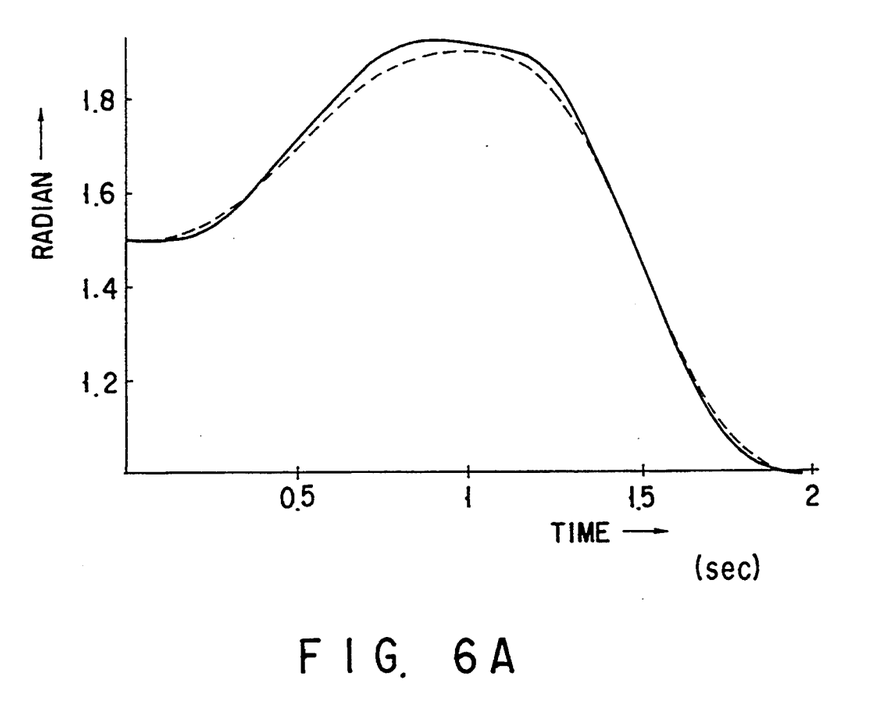
FIGS. 6A and 6B are a graph showing an operational effect achieved in the embodiment of FIG. 1.
Figure 6B:
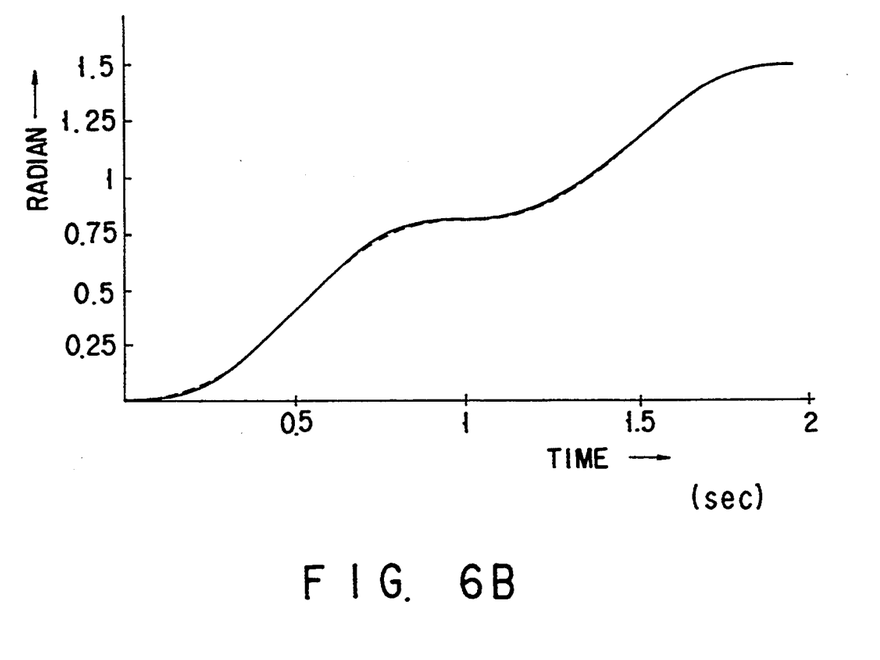
Figure 7A:
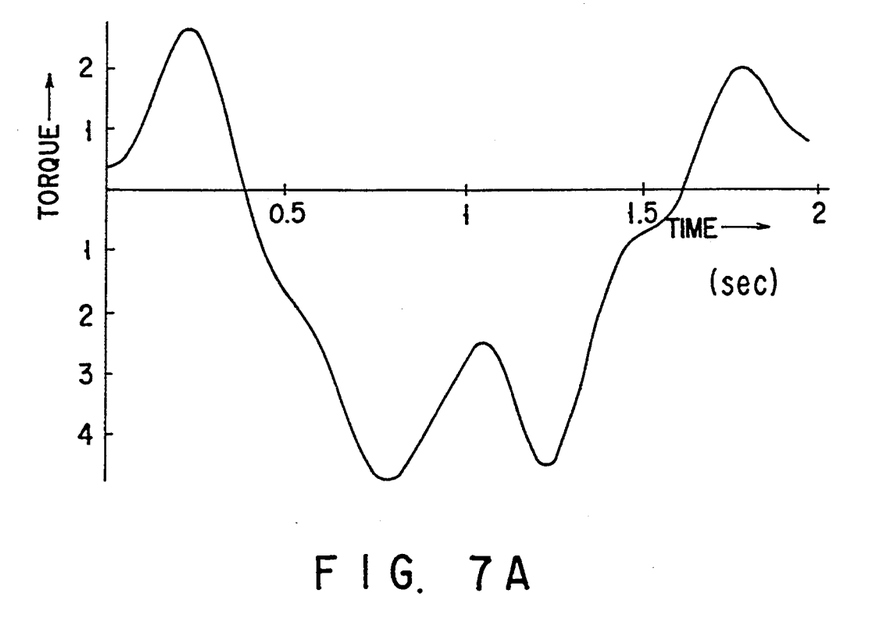
FIGS. 7A and 7B are a graph showing an operational effect achieved in the embodiment of FIG. 1.
Figure 7B:
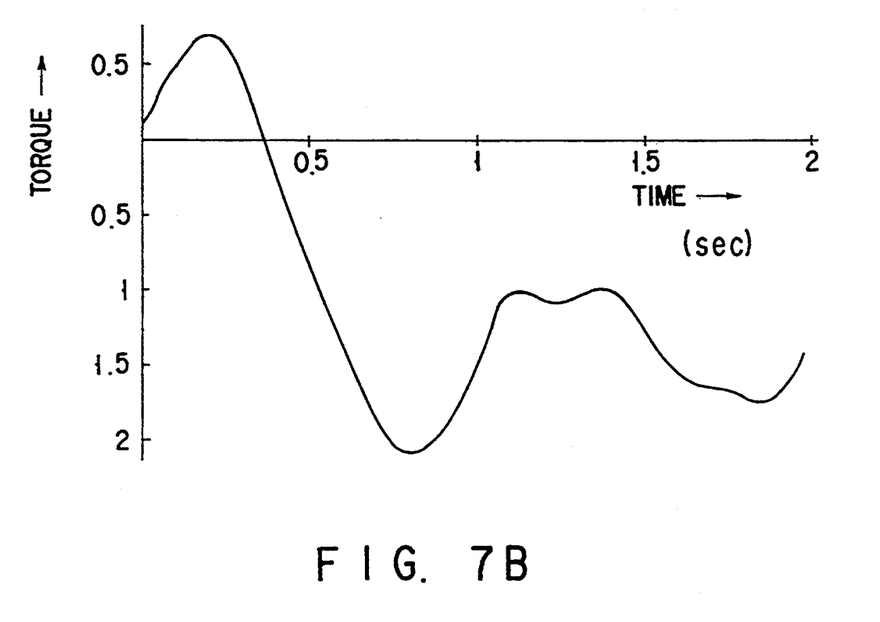

FIGS. 6A and 6B and FIGS. 7A and 7B show a result of simulation, with the manipulator of FIG. 2 as an object to be controlled, when the repetition operation is done three times at the sampling time as in the flow chart shown in FIG. 5. FIGS. 6A and 6B show the first and second joint angles and FIGS. 7A and 7B show the waveform diagrams of the first and second joint torques, respectively. In FIGS. 6A, 6B, 7A, and 7B the abscissa shows a motion time (two seconds), while in FIGS. 6A and 6B the ordinate shows the trajectory of the joint angle in rad (unit) and in FIGS. 7A and 7B the ordinate shows a torque waveform in Nm (unit). Further, the broken lines of FIGS. 6A and 6B show a desired trajectory while the solid lines of FIGS. 6A and 6B show a realized trajectory. From FIGS. 6A and 6B it is evident that the realized trajectory (solid line) well follows the desired trajectory (broken line) because the realized trajectory is substantially superimposed on the desired trajectory. In this case, the torque waveform is as shown in FIG. 7. In the flow chart shown in FIG. 5, tests were conducted by four or more repetition times at the sampling time and it has been found that the realized trajectory is approached to the desired trajectory and that the torque waveform involved is made smoother.

Although, in the aforementioned ,embodiment, the manipulator has been explained as being the object to be nonlinearly controlled, the present invention can also be applied to an object to be linearly controlled.

Although, in the aforementioned embodiment, only the manipulated variable after one sampling time has been explained, as the simplest example, as being evaluated for prediction, it is necessary, if one- or more order-differential equation is involved for the dynamic characteristic of the object to be controlled, to predict a controlled variable at one more previous time than one sampling time and to correct a manipulated variable from the error of a predictive value through back propagation. Even in this case, it is possible to control an object involving a higher order-differential equation for dynamic characteristic, through the learning by the neural network model for prediction not only at a one-previous sampling time but also at a two- or three-previous sampling time. FIGS. 8A and 8B and 9A and 9B show a neural network model for predicting a controlled variable until after two sampling times.

Figure 8A:
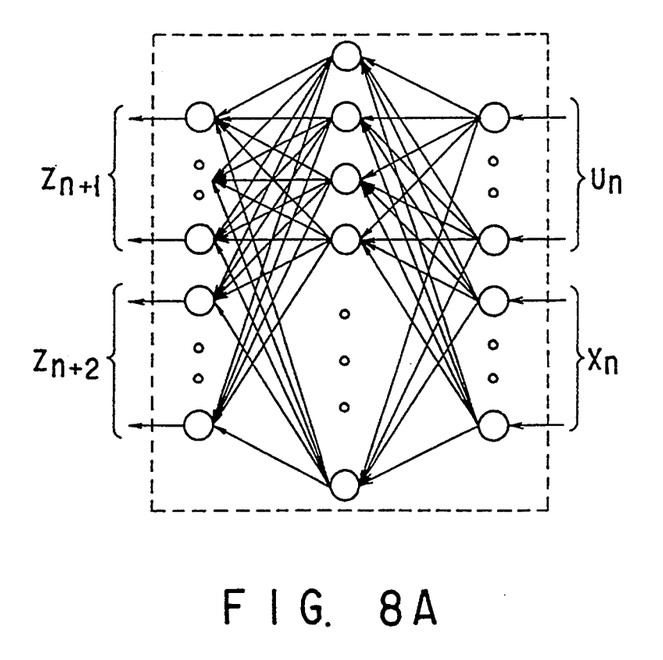
FIGS. 8A and 8B are a view for explaining a second form of an identification model shown in FIG. 1.
Figure 8B:
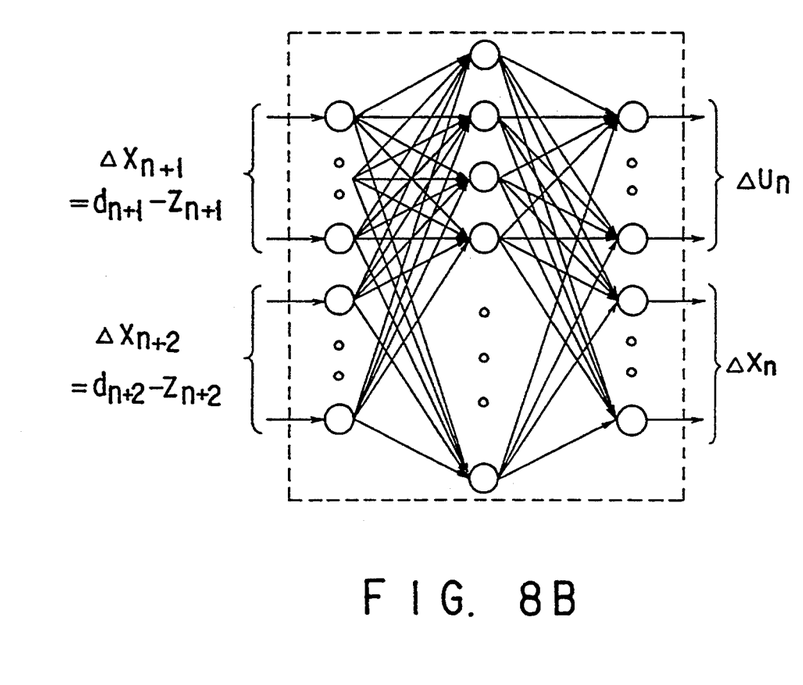

FIGS. 8A and 8B show a three-layered neural network model. The neural network model receives a manipulated variable, $U_n$, and controlled variable, $X_n$, at a first layer (rightmost layer) and delivers predictive values $Z_{n+1}$ and $Z_{n+2}$, at a third layer, corresponding to a controlled variable after a one-previous sampling time and manipulated variable after a two-previous sampling time, respectively. In the neural network model shown in FIG. 8B, the error $\Delta X_{n+1}=d_{n+1}-Z_{n+1}$ of the predictive value after one sampling time and error $\Delta X_{n+2}=d_{n+2}-Z_{n+2}$ of the predictive value after two sampling times are back propagated to produce an amount of correction, $\Delta U_n$, corresponding to the manipulated variable.

Figure 9A:
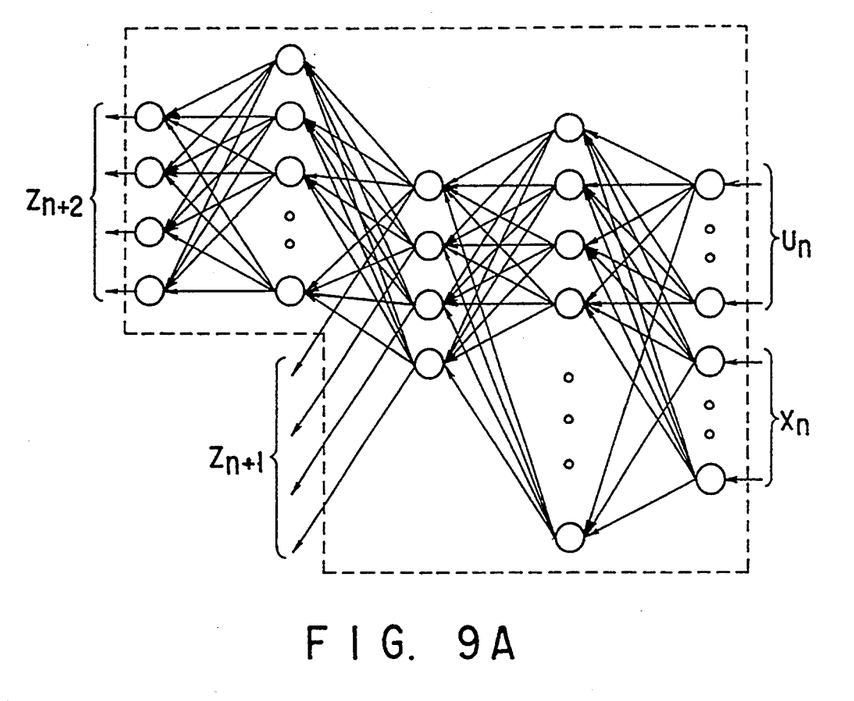
FIGS. 9A and 9B are a view for explaining a third form of an identification model in FIG. 1.
Figure 9B:
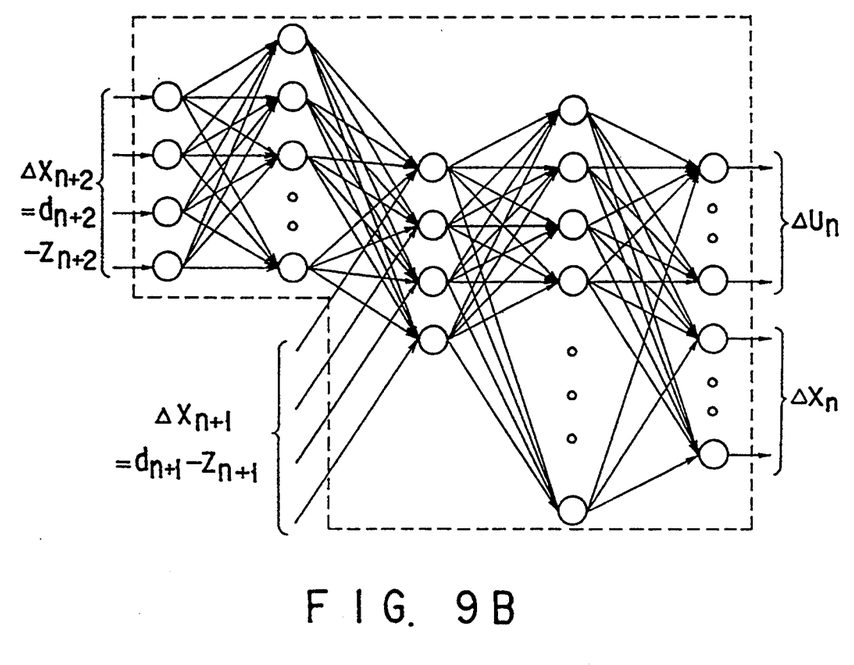

FIGS. 9A and 9B show a five-layered neural network model. The neural network model shown in FIG. 9A receives a manipulated variable, Un, and controlled variable, $X_n$, at a first layer (rightest layer) and delivers a predictive value $Z_{n+1}$, at a third layer, corresponding to a controlled variable after one sampling time and a predictive value $Z_{n+2}$, at a fifth layer, corresponding to a controlled variable after two sampling times. The neural network model of FIG. 9B delivers, through back propagation, the error $\Delta X_{n+1}=d_{n+1}-Z_{n+1}$, at a third layer, of a predictive value after one sampling time and error $\Delta X_{n+2}=d_{n+2}-Z_{n+2}$, at a fifth layer, of a predictive value after two sampling times and produces an amount of correction, $U_n$, corresponding to a manipulated variable.

According to the present invention, a predictive control method is provided which can control an object unknown in mathematical model for its dynamic characteristic in a predictive fashion and can compensate for any disturbance involved.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A predictive control method for controlling a physical object, the physical object being responsive to a manipulated variable signal $U_n$ and producing a controlled variable signal $X_n$, comprising the steps of:
   (1) preparing a multi-layered neural network as an identification model for said physical object;
   (2) receiving, at said multi-layered neural network, said controlled variable signal $X_n$ and said manipulated variable signal $U_n$, at a sampling time, and predicting a predicted value $Z_{n+1}$ for said controlled variable signal $X_n$ using said multi-layered neural network;
   (3) computing an error signal $\Delta X_{n+1}$ between said predicted value $Z_{n+1}$ and a desired value $d_{n+1}$ for said controlled variable signal $X_n$;
   (4) receiving said error signal $\Delta X_{n+1}$ at said multi-layered neural network, finding a correction amount $\Delta U_n$ for said manipulated variable signal $U_n$ using back propagation within said multi-layered neural network, and correcting said manipulated variable signal $U_n$ according to said correction amount $\Delta U_n$; and
   (5) transmitting said corrected manipulated variable signal to said physical object and controlling said physical object according to said corrected manipulated variable signal.

2. The method according to claim 1, wherein said predicting operation of step (2) comprises the steps of:
   (a) setting input signals corresponding to said manipulated variable signal $U_n$ and said controlled variable signal $X_n$; and
   (b) finding said predicted value $Z_{n+1}$ corresponding to an output value $X_{n+1}$ for said controlled variable signal $X_n$ using forward computation within said multi-layered neural network.

3. The method according to claim 1, wherein step (3) comprises the steps of:
   calculating an error signal $\Delta X_{n+1}$ from said predicted value $Z_{n+1}$ and said desired value $d_{n+1}$ on the basis of the following equation $$\Delta X_{n+1}=d_{n+1}-Z_{n+1};$$

and
   finding an error function $E_{n+1}$ from said error signal $\Delta X_{n+1}$ on the basis of the following equation $$E_{n+1}\frac{1}{2}(\Delta X_{n+1})^T K_s(\Delta X_{n+1})$$

where $K_s$=a gain determinant.

4. The method according to claim 1, wherein step 4 comprises the steps of:
   finding, using back propagation, said correction amount $\Delta U_n$, on the basis of the following equation $$\Delta U_n = -(dE_{n+1})/(dU_n)$$

where $E_{n+1}$ is an error function; and
   adding said correction amount $\Delta U_n$ to said manipulated variable signal $U_n$.

5. The method according to claim 1, wherein step (1) is performed by arranging said multi-layered neural network in three layers including an input layer, an intermediate layer and an output layer.

6. The method according to claim 1, wherein said predicting part of step (2), said computing part of step (3), and said finding part of step (4) are repetitively carried out over a period bounded by said sampling time.

7. A predictive control apparatus for controlling a physical object, the physical object being responsive to a manipulated variable signal $U_n$ and producing a controlled variable signal $X_n$, comprising:
- a multi-layered neural network used as an identification model for said physical object;
- first means for receiving said controlled variable signal $X_n$ and said manipulated variable signal $U_n$ into said multi-layered neural network, at a sampling time, and for predicting a predicted value $Z_{n+1}$ for said controlled variable signal $X_n$ using said multi-layered neural network;
- means for computing an error signal $\Delta X_{n+1}$ between said predicted value $Z_{n+1}$ and a desired value $d_{n+1}$ for said controlled variable signal $X_n$;
- second means for receiving said error signal $\Delta X_{n+1}$ into said multi-layered neural network, for finding a correction amount $\Delta U_n$ for said manipulated variable signal $U_n$ using back propagation within said multi-layered neural network, and for correcting said manipulated variable signal $U_n$ according to said correction amount $\Delta U_n$; and
- means for transmitting said corrected manipulated variable signal to said physical object and controlling said physical object in accordance with said corrected manipulated variable signal.

8. The apparatus according to claim 7, wherein said first means comprises
- means for setting input signals corresponding to said manipulated variable signal $U_n$ and said controlled variable signal $X_n$; and
- means for finding said predicted value $Z_{n+1}$ corresponding to an output value $X_{n+1}$ for said controlled variable signal $X_n$ using forward computation within said multi-layered neural network.

9. The apparatus according to claim 7, wherein said means for computing an error signal comprises:
- means for calculating an error signal $\Delta X_{n+1}$ from said predicted value $Z_{n+1}$ and said desired value $d_{n+1}$ on the basis of the following equation $$\Delta X_{n+1} = d_{n+1} - Z_{n+1};$$

and
- means for finding an error function $E_{n+1}$ from said error signal $\Delta X_{n+1}$ on the basis of the following equation $$E_{n+1} = \tfrac{1}{2}(\Delta X_{n+1})^T K_s (\Delta X_{n+1})$$

where $K_s$ = a gain determinant.

10. The apparatus according to claim 7, wherein said second means comprises:
- means for finding, using back propagation, said correction amount $\Delta U_n$, on the basis of the following equation $$\Delta U_n = -(dE_{n+1})/(dU_n)$$

where $E_{n+1}$ is an error function: and
- means for adding said correction amount $\Delta U_n$ to said manipulated variable signal $U_n$.

11. The apparatus according to claim 7, wherein said multi-layered neural network is comprised of a three-layered neural network having an input layer, an intermediate layer and an output layer.

12. The apparatus according to claim 7, wherein said transmitting means comprises:
- an integrator, coupled to said second means and having an output for supplying said manipulated variable signal $U_n$; and
- a switch, coupled to said integrator, for delivering said output of said integrator to said physical object, said switch being operable at a sampling interval.

13. The apparatus according to claim 12, wherein said output of said integrator comprises a joint angle torque, and wherein said controlled variable signal $X_n$ comprises joint angular velocities.

14. The apparatus according to claim 7, further comprising a delay circuit for delaying said controlled variable signal $X_n$ from said physical object.

* * * * *